United States Patent [19]

Poulain

[11] Patent Number: 5,494,241
[45] Date of Patent: Feb. 27, 1996

[54] DEVICE FOR COOLING A SATELLITE-MOUNTED TRAVELLING-WAVE TUBE

[75] Inventor: Bertrand Poulain, Villeneuve Tolosane, France

[73] Assignee: Matra Marconi Space France S.A., Paris, France

[21] Appl. No.: 186,782

[22] Filed: Jan. 25, 1994

[30] Foreign Application Priority Data

Jan. 26, 1993 [FR] France ................................ 93 00729

[51] Int. Cl.$^6$ ...................................... B64G 1/50
[52] U.S. Cl. ................................. 244/163; 165/41
[58] Field of Search ............................ 244/117 A, 163, 244/158 R, 158 A; 165/32, 41, 904, 96; 315/3.5, 39.3, 50, 112

[56] References Cited

U.S. PATENT DOCUMENTS

| | | | |
|---|---|---|---|
| 3,253,423 | 5/1966 | Sonnabend | 244/163 |
| 3,402,761 | 9/1968 | Swet. | |
| 5,332,030 | 7/1994 | Spencer et al. | 244/163 |
| 5,372,183 | 12/1994 | Strickberger | 244/163 |

FOREIGN PATENT DOCUMENTS

| | | |
|---|---|---|
| 505862 | 3/1992 | European Pat. Off. . |
| 0229800 | 9/1989 | Japan ................................ 244/163 |

OTHER PUBLICATIONS

La Recherche Spatiale, vol. XIII, No. 3, pp. 15–20. P. Fayet "Une nouvelle génération de dispositifs de contrôle thermique des satellites: les caloducs"—abstract.

Database WPI—Section EI, Week 4390, 1990. Derwent Publications Ltd. London, GB; Class V04, AN 90–325342 & JP-A-2 234 327 (Nippon Hoso Kyokai KK) Sep. 17, 1990—Abstract.

Patent Abstracts of Japan, vol. 17, No. 22 (E–1307) Jan. 14, '93 & JP-A-04 249 836 (NEC Corp) Sep. 4, 1992—Abstract.

Primary Examiner—Galen L. Barefoot
Attorney, Agent, or Firm—Larson & Taylor

[57] ABSTRACT

The cooling device for cooling a travelling-wave tube is deigned to be mounted on board a geostationary telecommunications satellite. The collector of the tube is thermally insulated from the remainder of the tube and it is thermally connected to a radiator by means of a link part passing through a north or a south panel of the satellite structure and insulated from the panel.

7 Claims, 1 Drawing Sheet

DEVICE FOR COOLING A SATELLITE-MOUNTED TRAVELLING-WAVE TUBE

BACKGROUND OF THE INVENTION

The present invention relates to a cooling device for dumping the heat generated by a travelling-wave tube (TWT) of high power (generally more than 100 W at radiofrequency) of the kind mounted on telecommunications satellites.

Maintaining a travelling-wave tube at a temperature compatible with long lifetime is complicated by the special conditions encountered in space applications, where cooling can hardly be done otherwise than by radiating to black space, and where constraints on bulk and weight are very severe.

At present, use is made in particular of a cooling device that includes thermal link means from the tube collector (which generates about 90% of the total thermal power of the travelling-wave tube) to means for radiating the heat to space that are constituted by the general radiator of the satellite. However, under such circumstances, the radiator must be dimensioned so as to maintain all of the parts to which it is connected at the lowest of the temperatures required by any of the parts, which is generally less than 75° C. This requires the radiator to have a large radiating area.

Another solution, which makes allowance for the fact that the collector can tolerate a high temperature, greater than 200° C., consists in thermally insulating the collector from the remainder of the tube and in providing it with a cowling or cover or with a structure having radial fins, the cowling or the fins radiating directly into black space. Since the cowling or the radiating structure must be external, whereas the tube is internal, the tube must be mounted at the margin of the equipment-carrying panel (i.e. north or south panel for a platform that is stabilized about three axes). That solution which restricts the mounting area for TWTs to the margin of the panel requires the satellite to be given dimensions that are greater than required while the central portion is left unused. Furthermore, that generally requires long electrical and radiofrequency connections, in particular because the antennae also have to occupy predetermined positions.

SUMMARY OF THE INVENTION

An object of the invention is to provide an improved cooling device; it is a more specific object to make it possible simultaneously to relax accommodation constraints, to have short electrical and radiofrequency links, and to dump heat through a radiating area that is relatively small.

To this end, there is provided a cooling device wherein the collector of the travelling-wave tube is thermally insulated from the remainder of the tube, and dissipation means are constituted by an external radiator which is specific to the tube, and which is thermally connected to the collector by means that are insulated from the structure of the satellite. That arrangement makes it possible to place the tube anywhere on a portion of the satellite structure that faces north or south. In particular, in a satellite whose structure includes a platform and panels extending north and south, i.e. orthogonally to the pitch axis of the satellite, the travelling-wave tubes may be put in a location that is the most appropriate from the point of view of radiofrequency or electrical connections.

The external radiator may be fixed to the collector of the travelling-wave tube by dismountable means passing through the structure, thereby facilitating accommodation and assembly.

There is also provided a geostationary telecommunications satellite whose structure has north and south panels bearing, on internal faces thereof, travelling-wave tubes for providing radiofrequency energy and, on their external faces, flat radiators which are thermally insulated from the panels and which are connected to the respective collectors by means of interface parts that are thermally insulated from the panels.

The invention will be better understood from the following description of a particular embodiment given by way of example. The description refers to the accompanying drawings

DETAILED DESCRIPTION

Figure 1:
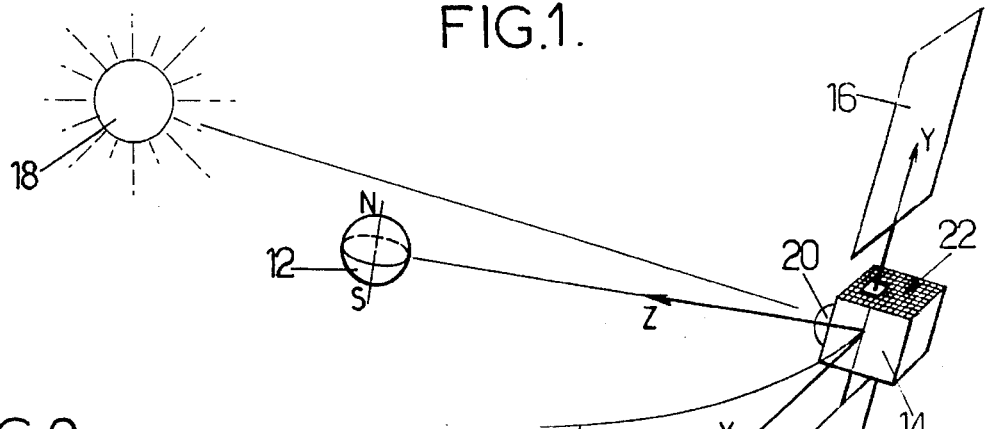
FIG. 1 is a diagram showing the general configuration of a geostationary telecommunications satellite.

The satellite whose general structure is shown in FIG. 1 is intended to be injected on a geostationary equatorial orbit 10 around the Earth 12. For a satellite that is stabilized about three axes (rather than spinned), the satellite generally comprises a structure 14 on which solar panels 16 can be rotated about the pitch axis Y (parallel to the axis of the Earth) so as to continuously face the sun 18. The structure 14 may include a platform on which antennae 20 and structure panels, generally honeycomb panels, are fixed. The north and south panels 22 have shafts passing through them carrying the solar panels 16. Nozzles (not shown) enable the satellite to be kept on station, in an orientation such that its roll axis X and its yaw axis Z are orthogonal to its faces.

The radiofrequency energy required for maintaining communications is generally provided by travelling-wave tubes. In operation such travelling-wave tubes generate energy that must be dissipated. About 90% of the power to be dissipated appears at the collector of the tube, whose temperature should not exceed about 220° C.

According to the invention, this result may be achieved by means of a radiator that dumps heat by radiating into black space, north or south of the satellite, while avoiding imposing cumbersome constraints on the location of the tube. For that purpose, the radiator 24 for cooling the collector of a TWT 26 may, as shown in FIG. 2, be placed outside a north or south panel 22, parallel to said panel and insulated from said panel, and it may then be connected to the collector of the tube 26, which is thermally insulated from the remainder of the tube, by heat conducting means that are insulated from the structure of the satellite.

Figure 2:
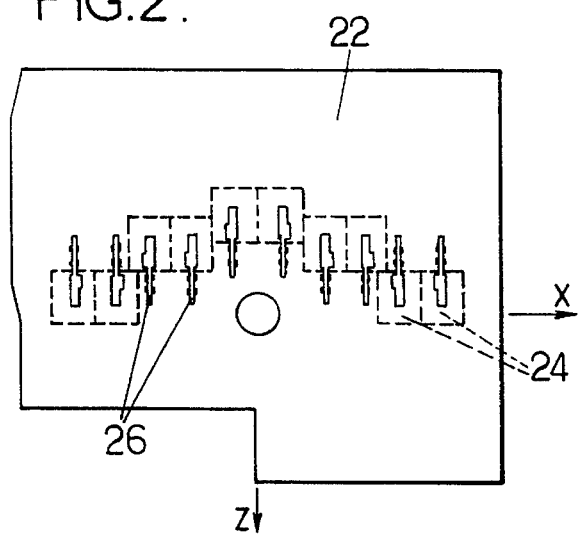
FIG. 2 shows one possible disposition for the means that dissipate the heat generated at the collectors of the travelling-wave tubes on a north or south panel of a satellite of the kind shown in FIG. 1.

Still with reference to the example shown in FIG. 2, the radiator is constituted by a plate whose area and outline are adapted to the power of the travelling-wave tube and to other elements carried by the external face of the structure and separate from the latter. In particular, the radiators 24 may be constituted by rectilinear plates, each dedicated to a respective collector, and disposed side by side. Nevertheless, it is also possible to connect a plurality of collectors thermally to a same plate.

Figure 3:
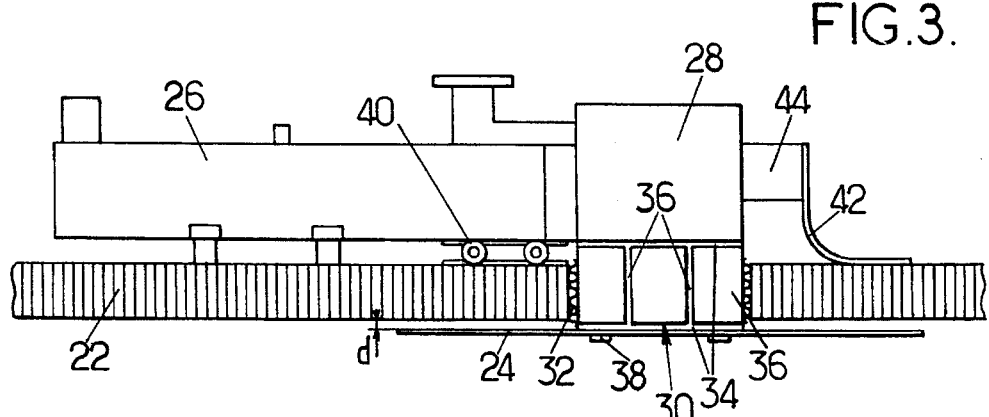
FIGS. 3 and 4 are detail views in cross-section on two mutually orthogonal planes, showing how the collector of a travelling-wave tube may be connected to its radiator.
Figure 4:
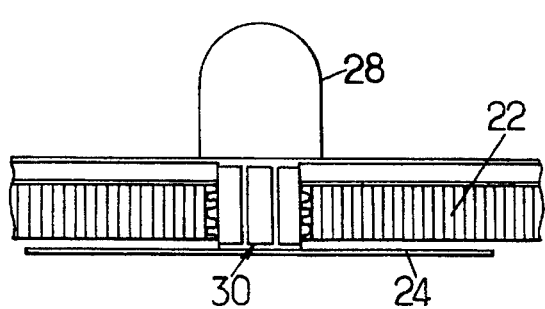

FIGS. 3 and 4 show a possible construction of the dissipation means using radiation. In the embodiment shown in FIGS. 3 and 4, the collector 28 of the travelling-wave tube is connected to the plate 24 constituting the external radiator by means insulated from the structure; such means include a conducting link part 30 that projects through the honeycomb structure panel 22. The link part 30 is kept separate from the wall of the hole that it passes through by an insulating lining 32. The link part 30 may be constituted by two sole plates 34 integral with cross-pieces 36. The radiator 24 may be fixed to the link part 30 by dismountable means such as screws 38. Since in operation, the radiator 34 is at a temperature that is considerably greater than the temperature of the panel 22, it must be thermally separate therefrom. For this purpose, it may suffice to leave a gap d of a few millimeters between the radiator and the panel 22.

In modified embodiments, a thin film thermal superinsulator is placed between the reflector 24 and the panel 22. The reflector 24 is fixed directly to the panel by means that are dismountable and insulating.

The radiation coefficient of the radiator 24 into space must be as high as possible. For this purpose, its outside face may be treated. If the radiator is constituted by an aluminium plate, then the treatment may be anodic oxidation.

The portion of the TWT other than the collector 28 thereof, that must be maintained at a lower temperature than the collector (typically 75° C.), may be cooled by establishing a heat leakage path towards panel 22. Heat pipes 40 may typically be used for this purpose.

Local cooling of the covering or embedding material of the electrical connections may be performed by a metal braid 42 connecting the internal face of the panel 22 to the covering 44. The link part 36 may constitute a coat that is in good thermal contact with the collector 28 and that is formed simultaneously therewith. Like the collector 28 and the radiator 24, it is made of a material that is capable of withstanding a relatively high temperature, generally in the range of 120° C. to 220° C. In operation, the high temperature of the radiator makes it possible to radiate the heat generated by the collector via a small emission area. In practice, the heat generated at the collector of a high Dower TWT (having a power of about 100 W at radiofrequency) can be dumped by means of a radiator having an area of about 6 dm2. The link part may comprise a cross-piece having a wall that is 3 mm thick and occupying a rectangle having an area of about 32 cm2.

As mentioned above, the shape of each radiator 24 may be adapted to the particular circumstances encountered.

Furthermore, it should be observed that the invention is not applicable solely to a satellite that is stabilized about three axes: it would be possible to fit the invention in the same manner to a spinned satellite that is stabilized by rotating slowly about a spin axis and that has a separate platform carrying antennae.

I claim:

1. In a telecommunication satellite having a structure and containing a travelling-wave tube having a collector thermally insulated from the remainder of the travelling-wave tube, a cooling device including:

an external radiator, located externally of said structure and in an orientation such that it dissipates heat by radiating it into space;

heat conducting means thermally insulated from the structure of the satellite and thermally connecting said radiator to said collector; and heat pipe means connecting the remainder of the travelling wave tube to said structure.

2. A device according to claim 1, wherein said external radiator is fixed to the collector by dismountable means passing through a panel belonging to the structure of the satellite.

3. A device according to claim 1, wherein said external radiator comprises a planar plate parallel to an external surface of the structure, and of dimensions that are proportioned to the power of the tube for maintaining said collector at a temperature below 220° C. and to the shape of the satellite.

4. A device according to claim 3, wherein the plate is separated from the structure of the satellite by a gap.

5. A device according to claim 3, wherein said radiator is separated from the structure of the satellite by a layer of superinsulation.

6. A device according to claim 1, wherein the insulated heat conducting means are constituted by a link part passing through a north or a south panel of the satellite structure and separated from the panel by an insulating liner.

7. A geostationary telecommunications satellite stabilized about three axes, having:

a structure comprising a north panel and a south panel;

travelling-wave tubes each carried by an internal face of at least one of said north panel and south panel;

flat radiators carried by an external face of said at least one of said panels at a distance from said at least one of said panels and thermally isolated from the panels; and interface parts thermally insulated from the panels, connecting said flat radiators to respective said collectors;

wherein each of said flat radiators comprises a planar plate parallel to an external surface of the structure and having dimensions which are proportioned to the power of the tube for maintaining said collector at a temperature below 220° C. and higher than that of the remainder of the travelling-wave tube.

* * * * *